(12) United States Patent  (10) Patent No.: US 8,213,049 B2
Inoue  (45) Date of Patent: Jul. 3, 2012

(54) IMAGE FORMING APPARATUS

(75) Inventor: Ryo Inoue, Toride (JP)

(73) Assignee: Canon Kabushiki Kaisha (JP)

( * ) Notice: Subject to any disclaimer, the term of this patent is extended or adjusted under 35 U.S.C. 154(b) by 823 days.

(21) Appl. No.: 12/184,498

(22) Filed: Aug. 1, 2008

(65) Prior Publication Data

US 2009/0034031 A1  Feb. 5, 2009

(30) Foreign Application Priority Data

Aug. 2, 2007 (JP) ................ 2007-201947
Jul. 29, 2008 (JP) ................ 2008-194345

(51) Int. Cl.
*H04N 1/40* (2006.01)
(52) U.S. Cl. ........................ 358/1.7; 358/510
(58) Field of Classification Search ................ 358/1.2, 358/1.7–1.9, 2.1, 3.12, 3.15, 509–510
See application file for complete search history.

(56) References Cited

U.S. PATENT DOCUMENTS

| | | | |
|---|---|---|---|
| 5,740,330 A * | 4/1998 | Abe | 358/1.2 |
| 5,974,231 A * | 10/1999 | Arakawa et al. | 358/1.9 |
| 6,320,682 B1 * | 11/2001 | Azumai et al. | 358/509 |
| 6,411,399 B1 * | 6/2002 | Mantell et al. | 358/1.2 |
| 6,992,792 B2 * | 1/2006 | Blumer | 358/1.2 |

FOREIGN PATENT DOCUMENTS

| JP | 2002-264391 A | 9/2002 |
|---|---|---|
| JP | 2004-109680 A | 4/2004 |

* cited by examiner

*Primary Examiner* — Thomas D Lee
*Assistant Examiner* — Stephen M Brinich
(74) *Attorney, Agent, or Firm* — Rossi, Kimms & McDowell LLP

(57) ABSTRACT

An image forming apparatus which can perform a multiple exposure with a plurality of laser lights driven by the PWM signal without deteriorating the image quality of a line image and a character image. Scanning start points are controlled to be different between a first light beam and a second light beam, among a plurality of light beams emit from a light source, exposing the identical pixel position.

5 Claims, 11 Drawing Sheets

IMAGE FORMING APPARATUS

BACKGROUND OF THE INVENTION

1. Field of the Invention

The present invention relates to an electrophotographic image forming apparatus using an electrophotographic printing method, and more particularly, to an image forming apparatus using exposure technology for exposing a photosensitive body to light beams.

2. Description of the Related Art

[Laser Driving with PWM]

Conventionally, an image forming apparatus using an electrophotographic printing method has been known. The image forming apparatus of this type forms an electrostatic latent image on a photosensitive body by exposing the photosensitive body to laser light from a laser that is driven on and off according to a PWM signal (a pulse width modulation signal) pulse-width-modulated for each pixel based on image data. The electrostatic latent image is developed as a visible image by a developer such as toner, and transferred to recording paper.

The PWM signal is generated by a pulse width modulation circuit (a PWM circuit) as shown in FIG. 10. The PWM circuit outputs a pulse signal having a value corresponding to a value of the input image data (a density value), and outputs the pulse signal to a laser driver for driving the laser.

The PWM circuit has a D/A conversion circuit 401, a triangle wave generation circuit 402, a comparator 403, and an oscillator 404. The D/A conversion circuit 401 converts the input digital image data, for example, of 8-bit, into analog image data, and outputs the analog image data to the comparator 403. The triangle wave generation circuit 402 generates a triangle wave in the same cycle as a clock signal from the oscillator 404, and outputs the triangle wave to the comparator 403 as a reference wave.

The comparator 403 compares the D/A-converted image data (a D/A output signal) with the triangle wave as the reference wave, and outputs to the laser driver (not shown) the PWM signal that becomes high level only when the image data is larger. For example, when the image data is expressed as 00h to FFh, and when the magnitude relation between the image data and the triangle wave is as shown in the upper part of FIG. 11, the comparator 403 outputs the pulse width modulation signal (a PWM signal) shown in the lower part of FIG. 11.

In other words, in a period for one pixel denoted by a reference numeral 51, the image data is larger than the triangle wave throughout the period, and accordingly, the PWM signal becomes "high" throughout the period for this pixel. On the other hand, in a period for one pixel denoted by a reference numeral 52, the image data is smaller than the triangle wave throughout the period, and accordingly, the PWM signal becomes "low" throughout the period for this pixel. In a period for one pixel denoted by a reference numeral 53, the image data is smaller than the triangle wave in the beginning and the ending portions of the period and the image data is larger than the triangle wave in a central portion of the period, and accordingly, the PWM signal becomes "low" in the beginning and the ending portions and becomes "high" in the central portion.

The laser driver turns on (lights) the laser in a period when the input PWM signal is "high" and turns off (extinguishes) the laser in a period when the input PWM signal is "low".

[Multiple Exposure Method]

More and more image forming apparatuses using an ROS (Raster Output Scanner) exposure device have made their exposure light sources into multi-beam, which is a technology that copes with increased speed and resolution of the apparatuses. This multi-beaming enables forming a plurality of scanning lines with one scan, thus enabling increased resolution and speed without increasing the number of revolutions of a polygon mirror.

However, the multi-beam leaves a streak in a scanning direction on an output image where the amount of light varies in each of the light beams. In a case where mirror surfaces of the polygon mirror vary in angle, scanning intervals vary to result in uneven streaks corresponding to the variety of the scanning intervals.

A single beam has narrower and inconspicuous scanning intervals and is thus less prone to cause an image defect, but the multi-beam has wider and conspicuous scanning intervals and thus has a tendency to cause the image defect. In a case where a surface-emitting laser made into the multi-beam is used, it is difficult to increase light amount compared with a laser of the single beam.

To solve such problems, a multiple exposure method has been proposed in which a plurality of light beams from different light sources are used to expose an identical pixel position of the photosensitive body for a plurality of times (see, Japanese Laid-Open Patent Publication (Kokai) No. 2002-264391 and Japanese Laid-Open Patent Publication (Kokai) No. 2004-109680).

In the meantime, an electric current equal to or more than a predetermined value (a threshold current) is needed to be applied to a laser for emitting laser light. Accordingly, where a pulse width of the PWM signal is narrow, laser emission may not be obtained depending on an emission characteristic of the laser due to a delay in emission. Therefore, in prior art, a bias electric current not exceeding the threshold current is previously applied to the laser. The application of this bias electric current enables reducing the amount of a switching electric current (a driving electric current by the PWM signal) up to reaching the threshold current, and enables the laser emission to be obtained even where the pulse width of the PWM signal is narrow.

However, the threshold current varies depending on a temperature, and for example, setting the bias electric current approximately the same as the threshold current may cause the laser to emit light by the bias electric current depending on the temperature. Accordingly, a set value of the bias electric current has to be made lower to some extent, and even where the bias electric current is applied, the pulse width of the PWM signal for laser emission, namely, a period of "high" (an ON period), is required to be made more than a certain width.

On the other hand, where the pulse width of the PWM signal is too wide in a period for one pixel, the laser is turned on throughout the period for the one pixel due to a delay in turning off even where there exists an OFF period of the laser within the period for the one pixel. This is caused by the laser driver failing to fully respond because a period in which the PWM signal is "low" is short within the period for the one pixel.

Therefore, where the laser is driven by the PWM signal, it causes a delay in emission and a delay in turning off. This defect is described based on FIG. 12. FIG. 12 is a figure showing a relationship between an image data value and light amount of laser emission of prior art. It should be noted that the image data value represents a density value and is proportional to a "high" duty of the PWM signal, namely, proportional to a value of the PWM signal in an electric current-supplied time.

In FIG. 12, in the electric current-supplied time where the image data value is in the range of "00h to 30h", there is no laser emission, and the output light amount of the laser is constant. Then, in the electric current-supplied time where the image data value is in the range of "30h to B0h", the relationship is linear between the image data value and the output light amount of the laser.

In the electric current-supplied time where the image data value is in the range of "B0h to D0h", linearity is not lost between the image data value and the output light amount of the laser, but the inclination becomes rapidly large to make it difficult to precisely control the output light amount of the laser. In the electric current-supplied time where the image data value is in the range of "D0h to FFh", the output light amount of the laser is saturated at the maximum amount of light.

To cope with this, a prior art image forming apparatus corrects the triangle wave as the reference wave and the D/A output signal so that the relationship between the image data value of "00h to FFh" and the output light amount of the laser is made linear as shown in the range of "30h to B0h" of FIG. 12.

That is, when the image data value is "00h", by providing the triangle wave with an offset component, the actual pulse width of the PWM signal is set to be the pulse width corresponding to a case where the D/A output signal value of FIG. 11 is "30h". On the other hand, when the image data value is "FFh", by adjusting the D/A output signal value with respect to the image data value, the actual pulse width of the PWM signal is set to be the pulse width corresponding to a case where the D/A output signal value of FIG. 11 is "B0h". Therefore, the relationship between the image data value and the output light amount of the laser is kept linear.

For example, in a case of outputting a line image and the like in which the image data values are "FFh" successively in a main scanning direction (an axial direction of the photosensitive body), the laser operates in intermittent light emission corresponding to the above-described pulse width "B0h" in each pixel period, thus causing a non-lighting period to occur. As shown in FIG. 13, this non-lighting period occurs at the beginning and the ending period of each pixel period, namely, occurs at periods continuing to a neighboring pixel. Thus, there has been a problematical point that a line becomes narrow or is interrupted and that the quality of a line image and a character image is thus deteriorated.

SUMMARY OF THE INVENTION

The present invention is made under such circumstances, and provides an image forming apparatus which can perform a multiple exposure with a plurality of laser lights driven by the PWM signal without deteriorating the image quality of a line image and a character image.

In a first aspect of the present invention, there is provided with an image forming apparatus forming an electrostatic latent image by performing a multiple exposure of an identical pixel position of a photosensitive body with a plurality of light beams pulse-width-modulated based on image data, the image forming apparatus comprising a light source adapted to emit the plurality of light beams, and a control unit adapted to control scanning start points, within one pixel in each pixel, of the plurality of light beams performing the multiple exposure, wherein the control unit controls scanning start points to be different between a first light beam and a second light beam, among the plurality of light beams, exposing the identical pixel position.

According to the present invention, it is possible to perform the multiple exposure with the plurality of laser lights driven by the PWM signal without deteriorating the image quality of the line image and the character image.

The above and other objects, features, and advantages of the invention will become more apparent from the following detailed description taken in conjunction with the accompanying drawings.

DESCRIPTION OF THE EMBODIMENTS

The present invention will now be described in detail with reference to the drawings showing preferred embodiments thereof. It should be noted that the relative arrangement of the components, the numerical expressions and numerical values set forth in these embodiments do not limit the scope of the present invention unless it is specifically stated otherwise.

Figure 1:
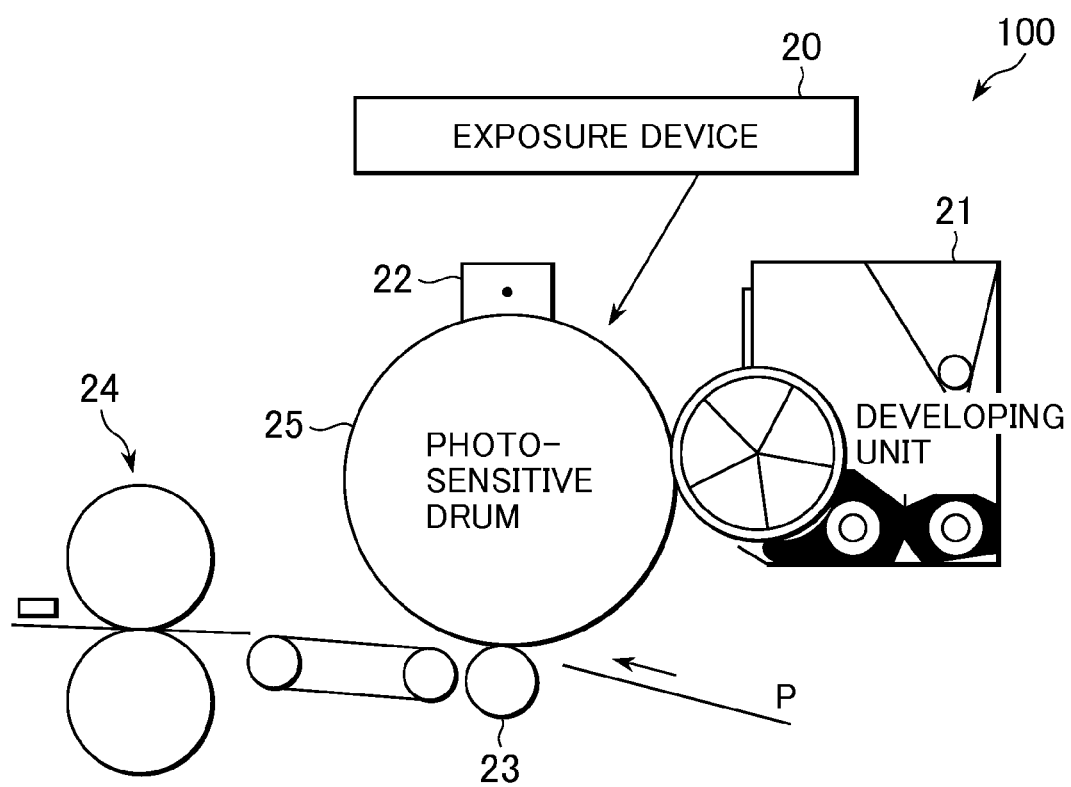
FIG. 1 is a diagram showing a schematic structure of an image forming apparatus according to an embodiment of the present invention.

FIG. 1 is a diagram showing a schematic structure of an image forming apparatus according to an embodiment of the present invention. An image forming apparatus 100 in FIG. 1 comprises an exposure device 20, a developing unit 21, a charging unit 22, a transfer roller 23, a fixing unit 24, and a photosensitive drum 25.

The photosensitive drum 25 has a structure formed by laminating a photosensitive layer on an electrically conductive base material of a metal in a cylindrical shape, and rotates in the direction of the arrow. The charging unit 22 is a corona electrification unit, and uniformly charges the photosensitive drum 25 to a desired electrical potential with a voltage applied by a bias power source. For example, the bias power source at a position opposed to the photosensitive drum 25 uniformly charges a surface of the photosensitive drum 25 to approximately −800V (a dark potential: Vd).

The exposure device 20 scans and exposes the photosensitive drum 25, charged by the charging unit 22 to the above dark potential, to laser lights (light beams) that are pulse-width-modulated by a plurality of pulse width modulation circuits (PWM circuits) 400 (FIG. 4) described later based on the image data. This scanning exposure forms an electrostatic latent image reflecting the image data on the surface of the photosensitive drum 25. The electrical potential (light potential: VL) of the laser lights is approximately −200V.

In this way, an emission of the laser light having the electrical potential (approximately −200V) whose absolute value is less than that of the dark potential (approximately −800V) causes an electrical potential of the electrostatic latent image formed on an emitted portion (an exposed portion) to become less than that of the dark potential (approximately −800V).

The electrostatic latent image formed on the surface of the photosensitive drum 25 is developed by the developing unit 21 with a developer such as toner and the like. The developing unit 21 has a developing sleeve for charging toner. A developing bias (for example, DC=−500V and AC) is applied by a developing bias power source to the developing sleeve.

The transfer roller 23 transfers a toner image formed on the photosensitive drum 25 to a recording medium P such as recording paper and the like. The transfer roller 23 is composed of a mandrel applied with a bias power by the bias power source and a medium-resistance elastic layer formed on the outermost layer of the mandrel.

The recording medium P finished with the transfer is conveyed to the fixing unit 24 via a conveyance belt. The fixing unit 24 has a fixing roller and a pressure roller, and the toner image onto the recording medium P is subjected to pressurization and heat treatment.

Figure 2:
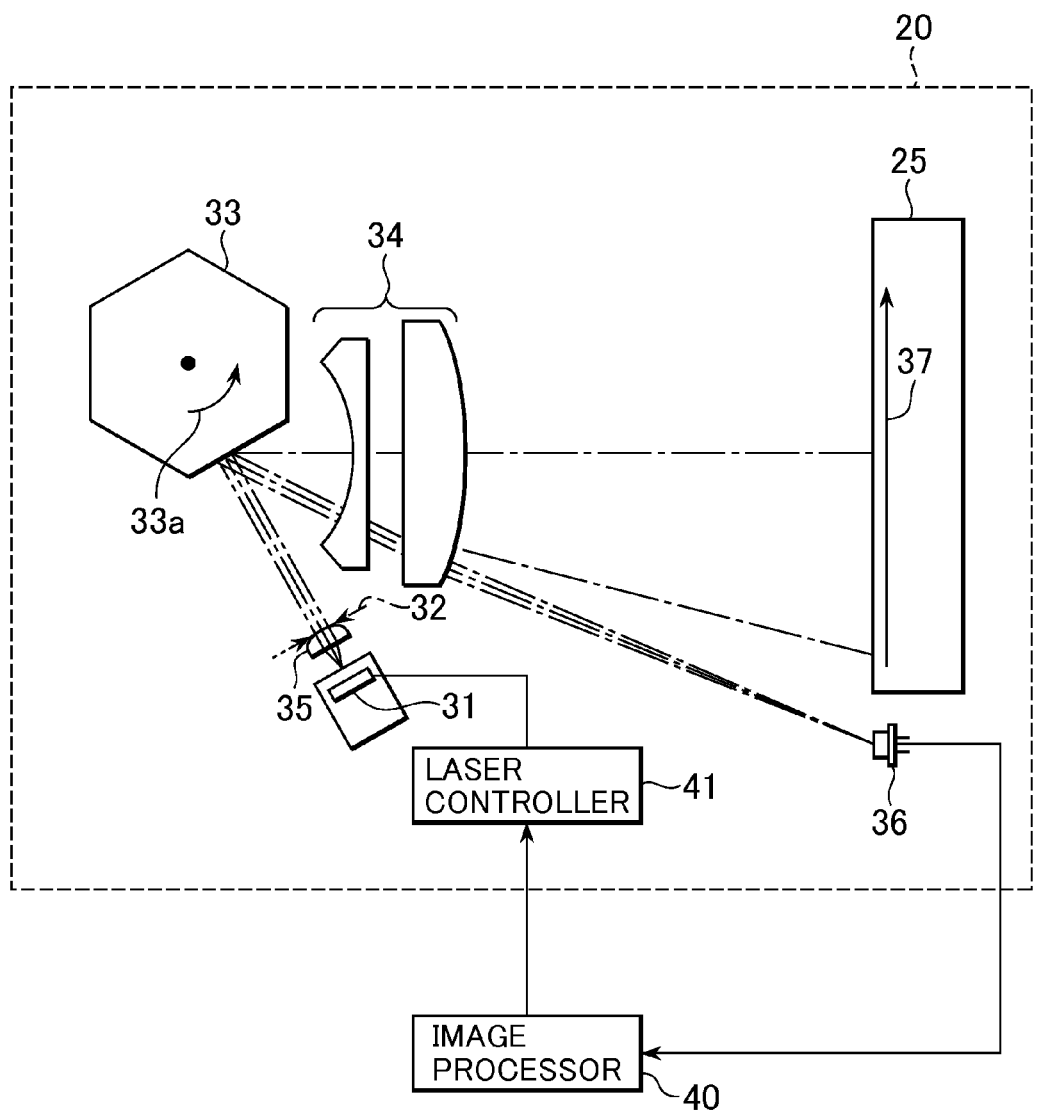
FIG. 2 is a diagram showing a schematic structure of an exposure device in the image forming apparatus of FIG. 1.

FIG. 2 is a diagram showing a schematic structure of the exposure device 20 in the image forming apparatus 100 of FIG. 1. The exposure device 20 shown in FIG. 2 generally has a surface-emitting laser 31 as a multi-beam laser source, a collimator lens 35, an aperture (an optical diaphragm) 32, a polygon mirror 33, and an fθ lens group 34, which are disposed in sequence, and the exposure device 20 is structured to scan the surface of the photosensitive drum 25 of the image forming apparatus 100 having the exposure device 20. Further, the exposure device 20 has a photodetector (a BD sensor) 36 and a laser controller 41. The laser controller 41 controls emission of the surface-emitting laser 31 based on a signal from an image processor 40 of the image forming apparatus 100.

The surface-emitting laser (VCSEL) 31 has a plurality of laser light sources (L1 to L8), which are arranged in two-dimension, as later described with FIG. 3, and the plurality of laser light sources are separately emission-controlled based on image data. The collimator lens 35 (a beam shaping unit) causes a plurality of laser lights (laser beams) emitted from the surface-emitting laser 31 to be one bundled parallel laser beams (light flux). The aperture 32 adjusts the sectional shape (spot shape and spot diameter) of the laser beam from the collimator lens 35.

The polygon mirror 33 is rotated by a driving motor (not shown) at a constant speed (a constant angular speed) in the direction of the arrow 33a. The fθ lens group 34 corrects distortion so as to ensure temporal linearity of the scanning on the photosensitive drum 25.

Next, a description will be made following an optical path. After the laser beams emitted from the surface-emitting laser 31 are converted into a substantially parallel lights by the collimator lens 35 and the aperture 32, the laser beam having a prescribed beam diameter comes into the polygon mirror 33. The polygon mirror 33 is being rotated at the constant angular speed in the direction of the arrow 33a in the drawing, and the incoming laser beam is reflected upon being converted into a polarized beam continuously changing angle along with the rotation of the polygon mirror 33. The fθ lens group 34 exerts a condensing effect on the polarized beam. At the same time, the fθ lens group 34 corrects distortion on the laser beam so as to ensure the temporal linearity of the scanning on the photosensitive drum 25. The thus corrected laser beam is coupled and scanned the photosensitive drum 25 at the constant speed in the direction of the arrow 37.

The photodetector (a BD sensor) 36 receives the laser beam passed through the fθ lens group 34 from the polygon mirror 33.

When the laser beam comes in, the photodetector 36 generates a horizontal synchronizing signal (a BD signal) serving as a write reference in the main scanning direction, that is, a longitudinal direction (the axis direction) of the photosensitive drum 25. The horizontal synchronizing signal is used as a horizontal synchronizing signal for synchronizing the rotation of the polygon mirror 33 and writing of the image data to the photosensitive drum 25. The image signal is output from the image processor 40 to the laser controller 41 based on this synchronization signal.

In an image section in which a latent image is formed on the photosensitive drum 25, the laser controller 41 further controls an electric current value and a driving time of a driving (light emitting) signal for the surface-emitting laser 31 based on the image signal input from the image processor 40. In this way, the laser beams emitted from the surface-emitting laser 31 are converted into the substantially parallel light by the collimator lens 35 and the aperture (the optical diaphragm) 32, and thereafter, the laser beam having a predetermined beam diameter comes into the polygon mirror 33.

A PDIO (not shown) as a photoreceiving element is disposed in a peripheral end region of the aperture (the optical diaphragm) 32. A detection signal of the PDIO is used for a control of a light emitting amount of the surface-emitting laser 31, namely, for auto power control (APC) for determining the electric current value of the driving (lighting) signal.

Figure 3:
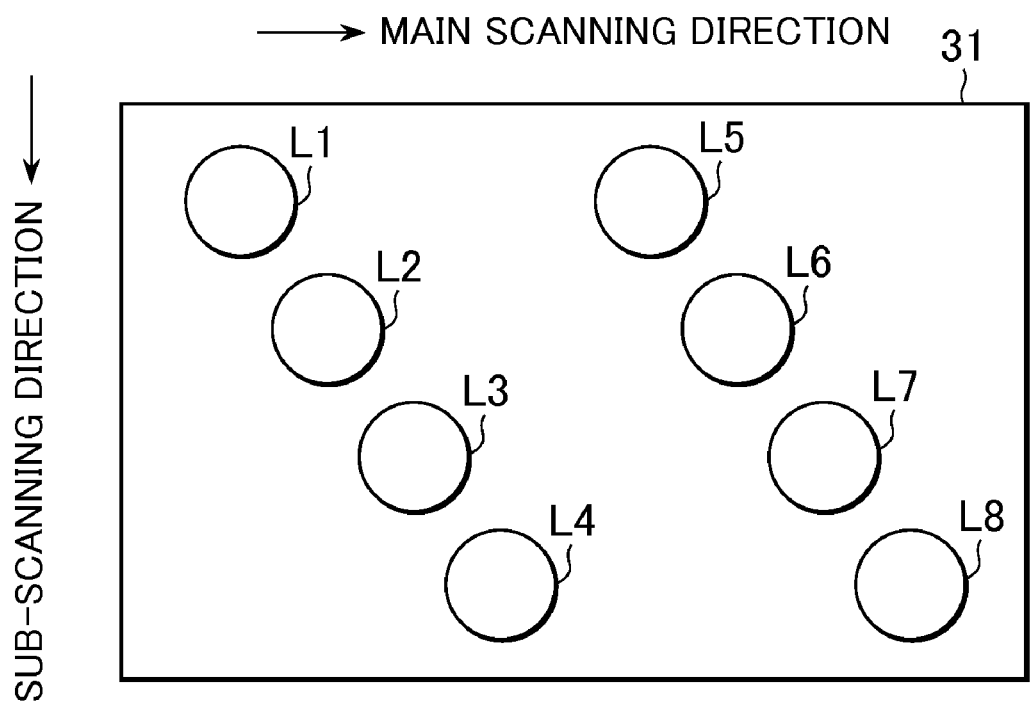
FIG. 3 is a diagram showing a light-emitting surface of a surface-emitting laser in the exposure device shown in FIG. 2.

FIG. 3 is a diagram showing a light-emitting surface of the surface-emitting laser 31 in the exposure device 20 shown in FIG. 2. Eight lasers L1 to L8 as light sources are arranged in two-dimension in a lattice pattern on the light-emitting surface of the surface-emitting laser 31. The lasers L1, L5 are disposed at an identical position with respect to a sub-scanning direction, namely, disposed on an identical main scanning line. Similarly, the lasers L2, L6, the lasers L3, L7, and the lasers L4, L8 are respectively disposed at an identical position with respect to the sub-scanning direction (on an identical main scanning line).

The lasers L1 to L4 are disposed so that an interval in the sub-scanning direction becomes one pixel. Similarly, the lasers L5 to L8 are disposed so that the interval in the sub-scanning direction becomes one pixel. The lasers L1 to L4 are disposed so that the interval in the main scanning direction becomes approximately ⅔ pixel. Similarly, the lasers L5 to L8 are disposed so that the interval in the main scanning direction becomes approximately ⅔ pixel. The lasers L1, L5, the lasers L2, L6, the lasers L3, L7, and the lasers L4, L8 performing the multi-exposure as described later are spaced apart by approximately 3.3 pixels, respectively.

The specifications and performance of the eight lasers L1 to L8 have the same standards, and for example, an oscillation wavelength thereof is standardized to about 700 to 800 nm.

The eight lasers L1 to L8 respectively have laser driving circuits LD1 to LD8 that a laser driver 16 has. Under control of the laser controller 41, these laser driving circuits LD1 to LD8 can turn on/off (select) the corresponding lasers L1 to L8, and can switch a light emitting intensity corresponding thereto. The laser controller 41 controls laser emission of the surface-emitting laser 31 based on the image data (a rasterizing signal) from the image processor 40. The image processor 40 performs various processings with respect to the image data such as correction processing and the like, and rasterizes the image data as vector information to convert the information into bitmap information.

The laser controller 41 controls driving of the eight lasers L1 to L8 of the surface-emitting laser 31 based on one pixel of the image data rasterized by the image processor 40. In other words, the laser controller 41 decides light emission patterns (scanning start points) of the lasers L1 to L8 derived from the one pixel of the rasterized image data based on information such as attribute data (color, character/non-character, and the like), density data, and the like with respect to the image.

It should be noted that the lasers L1 to L8 are referred to as a laser L where the lasers L1 to L8 are generally described without distinguishing therebetween. The PWM signals driving the lasers L1 to L8 are referred to as the PWM signals S1 to S8 where the PWM signals are related to the lasers L1 to L8 and are distinguished therebetween, but the PWM singles are referred to as the PWM signal S where the PWM signals are generally described without distinguishing therebetween.

The exposure device 20 controls driving of the surface-emitting laser 31 so as to make the lasers L1, L5 perform the multiple exposure of an identical pixel. Similarly, the exposure device 20 controls driving of the surface-emitting laser 31 so as to make the lasers L2, L6, the lasers L3, L7, and the lasers L4, L8 respectively perform the multiple exposure of an identical pixel. It should be noted that "an identical pixel" is a term meaning an identical data component in the image data and also meaning an identical positional component on the photosensitive body (the photosensitive drum 25). Further, it should be noted that an image resolution in the present embodiment is 600 dpi for both the main scanning and the sub-scanning.

Figure 4:
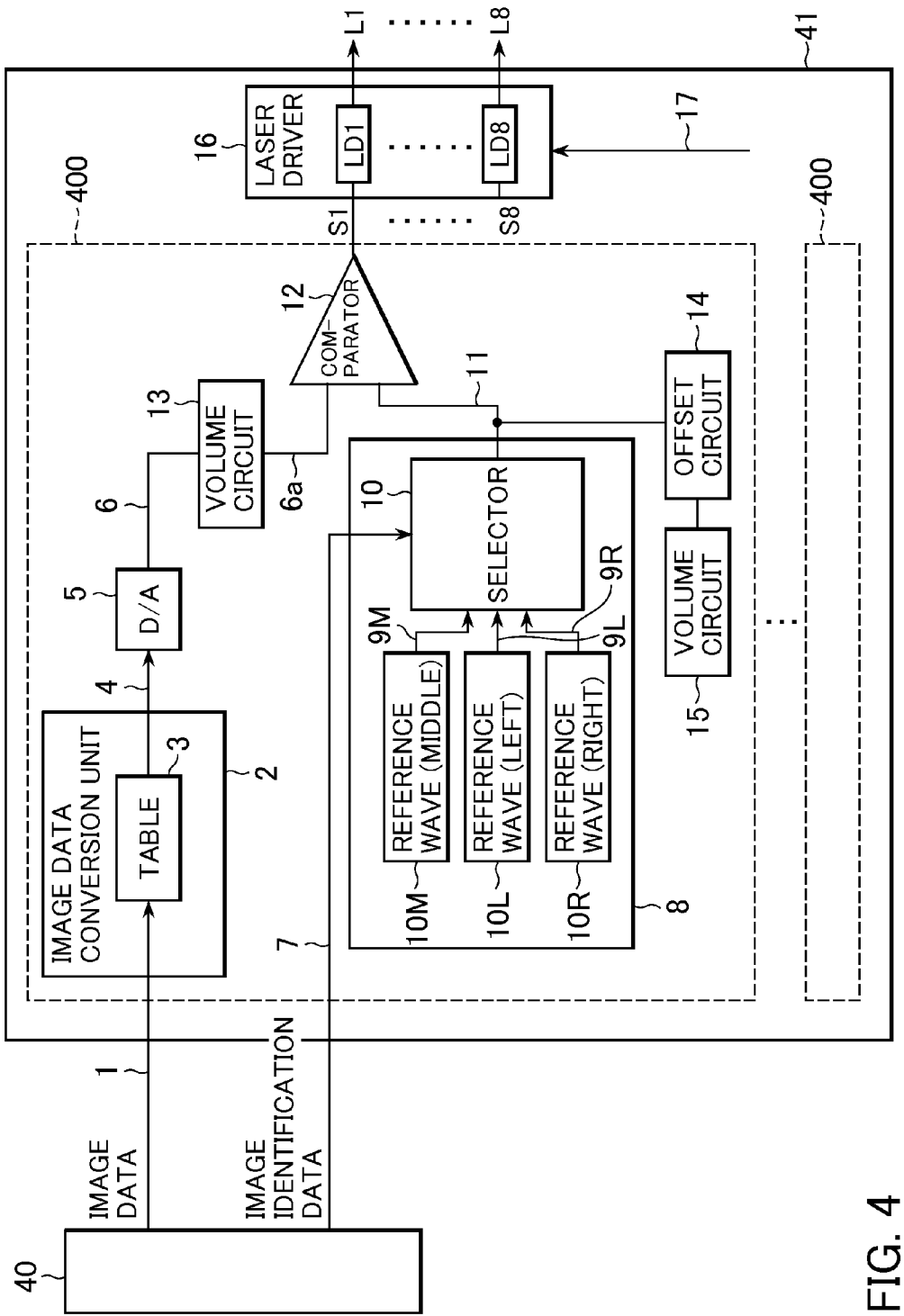
FIG. 4 is a block diagram showing a structure of a PWM circuit in the exposure device.

The lasers L1 to L8 of the surface-emitting laser 31 are individually driven by the PWM circuits 400 as shown in FIG. 4. In the present embodiment, there are eight PWM circuits 400 corresponding to the eight lasers L1 to L8. That is, the plurality of light beams for the multiple exposure are individually generated by the plurality of light sources.

Image data 1 as density data and image identification data 7 as image attribute data are input to the PWM circuit 400 of FIG. 4 from the image processor 40. The image data 1 is 8-bit data and has 16 levels of density. It should be noted that a prescribed image processing such as gamma correction and the like has been performed on the image data 1.

The image data 1 is converted with a conversion table 3 of an image data conversion unit 2 into an image data conversion signal 4, and is input to a D/A converter 5. The image data conversion signal 4 functions as a signal for determining a pulse width of the PWM signal S (a period in which the PWM signal S is "high", as described later). The D/A converter 5 converts the digital image data conversion signal 4 into an analog signal. Thereafter, a volume circuit 13 to generate a D/A output signal 6a adjusts a value of an analog image data conversion signal 6, and the D/A output signal 6a is output to a comparator 12.

The image identification data 7 is 2-bit data, and shows that the image data 1 currently input to the PWM circuit 400 is image data of a type of whether a binary image (a line image, for example, a character image) or a gradation image (for example, a non-character image). The image identification data 7 is used as a signal for selecting any one of later-described three reference waves, namely, a reference wave (middle) 9M, a reference wave (left) 9L, and a reference wave (right) 9R. That is, the image identification data 7 is used as the signal for selecting any one of growing positions of the PWM signal, namely, central growth with the reference wave (middle) 9M, left growth with the reference wave (left) 9L, and the right growth with the reference wave (right) 9R.

The image identification data 7 is input to a selector 10 of a reference wave supplying unit 8. The reference wave supplying unit 8 has generation circuits 10M, 10L, and 10R generating the three reference waves, namely, the reference wave (middle) 9M, the reference wave (left) 9L, and the reference wave (right) 9R. The reference wave (middle) 9M, the reference wave (left) 9L, and the reference wave (right) 9R are input to the selector 10. The selector 10 selects, based on the image identification data 7, any one of the three reference waves, namely, the reference wave (middle) 9M, the reference wave (left) 9L, and the reference wave (right) 9R, and outputs the selected reference wave to the comparator 12.

The comparator 12 compares the D/A output signal 6a output from the volume circuit 13 and a reference wave 11 relating to the selection output from the selector 10. Then, the comparator 12 outputs to the laser driver 16 the PWM signal S that becomes "high" while the D/A output signal 6a is larger than the reference wave 11 and that otherwise becomes "low".

The laser driver 16 drives the corresponding laser L based on the input PWM signal S. That is, the laser driver 16 controls driving of the corresponding laser L so as to turn on (light) the corresponding laser L during a period in which the PWM signal S is "high" and turn off (extinguish) the corresponding laser L during a period of "low". Although FIG. 4 shows all the PWM signals S1 to S8 and all the lasers L1 to L8 for the sake of convenience, there actually exists the eight PWM circuits 400 respectively corresponding to the lasers L1 to L8, as described above. In a below description, the eight PWM circuits 400 are not distinguished from each other with correspondence to the lasers L1 to L8, and will be referred to as the PWM circuit 400.

An offset generation circuit 14 is a circuit giving an offset component to the selected reference wave 11, and an amount of offset can be adjusted by the volume circuit 15. In the present embodiment, this offset adjust enables the adjustment for the pulse width of the PWM signal where the image data value is "00h", namely, the minimum pulse width of the PWM signal S (00h adjustment).

Also, it is possible to adjust the pulse width of the PWM signal where the image data value is "FFh", namely, the maximum pulse width of the PWM signal S (FFh adjustment) by inputting to the comparator 12 the D/A output signal 6a adjusted the output from the D/A converter 5 by the volume circuit 13.

Figure 12:
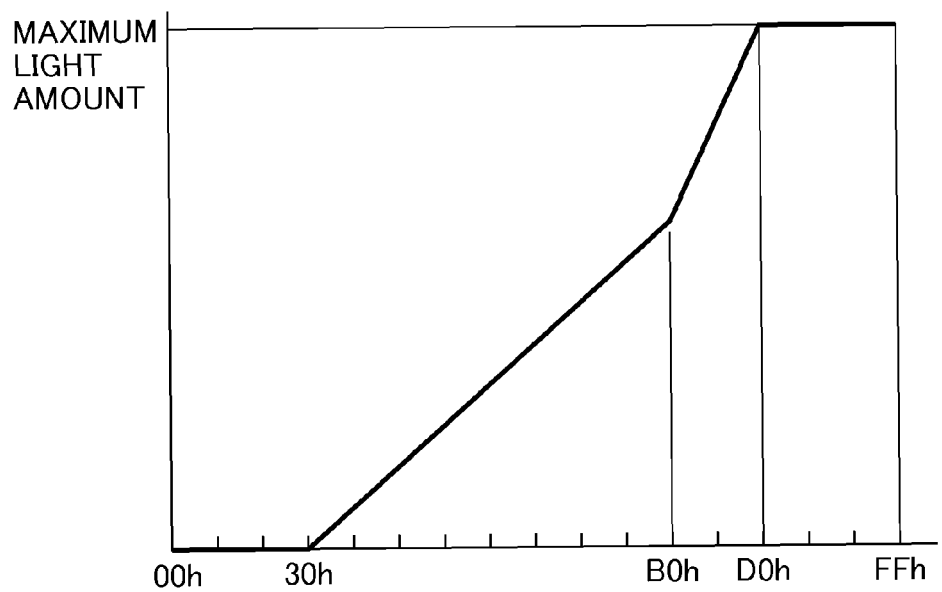
FIG. 12 is a diagram showing a relationship between an image data value and light amount of laser emission in a prior art.
Figure 13:
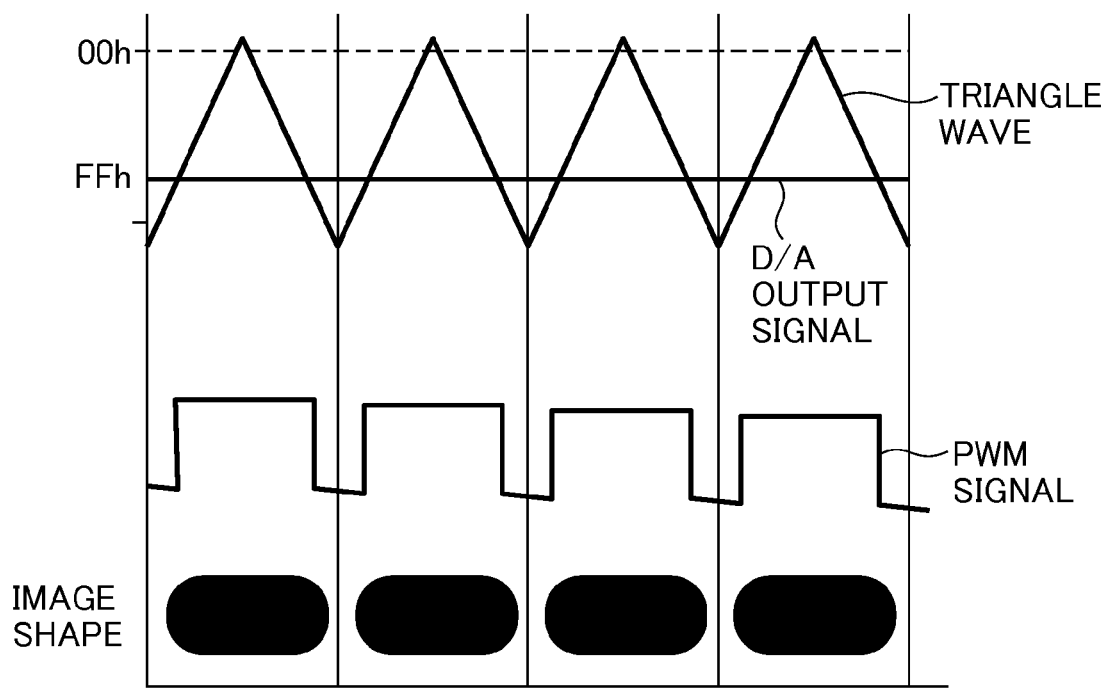
FIG. 13 is a diagram showing various signal waveforms and an output image in a case of the binary image according to the prior art.

Due to the 00h adjustment and FFh adjustment as described above, the width of the PWM signal changes within a region in which a relationship becomes linear between the image data and the light amount of the laser, that is, in the example of FIG. 12, within a region between "30h" and "B0h".

It should be noted that a timing signal 17 is generated based on a signal from a PD sensor 36 (FIG. 2), and the timing signal 17 is input to the PWM circuit 400. The PWM circuit 400 controls driving of the corresponding laser L so as to form, based on the timing signal 17, the electrostatic latent image on the photosensitive drum 25 at a desired position corresponding to the image data.

That is, the lasers L1, L5, the lasers L2, L6, the lasers L3, L7, and the lasers L4, L8 performing the multiple exposure are spaced apart by approximately 3.3 pixels as described above. On the other hand, the light beams from the lasers L1, L5 are emitted to the photosensitive drum 25 as polarized beams due to the rotation of the polygon mirror 33. Accordingly, the image data 1, the timing signal 17, the later-described reference wave, and the like are supplied to the PWM circuit 400 relating to the lasers L1, L5 at a timing shifted by approximately as much as 3.3 pixels. Thus, the light beams from the lasers L1, L5 relating the identical pixel of the identical image data can perform the multiple exposure on the identical point (the identical pixel position) of the photosensitive drum 25.

However, in later-described time charts in FIGS. 5, 6, 7, and 8, a time axis with respect to the lasers L1, L5 is aligned with reference to the identical pixel for the sake of convenience of description. This also similarly applies to a case where the multiple exposure is performed with the lasers L2, L6, the lasers L3, L7, and the lasers L4, L8.

Figure 5:
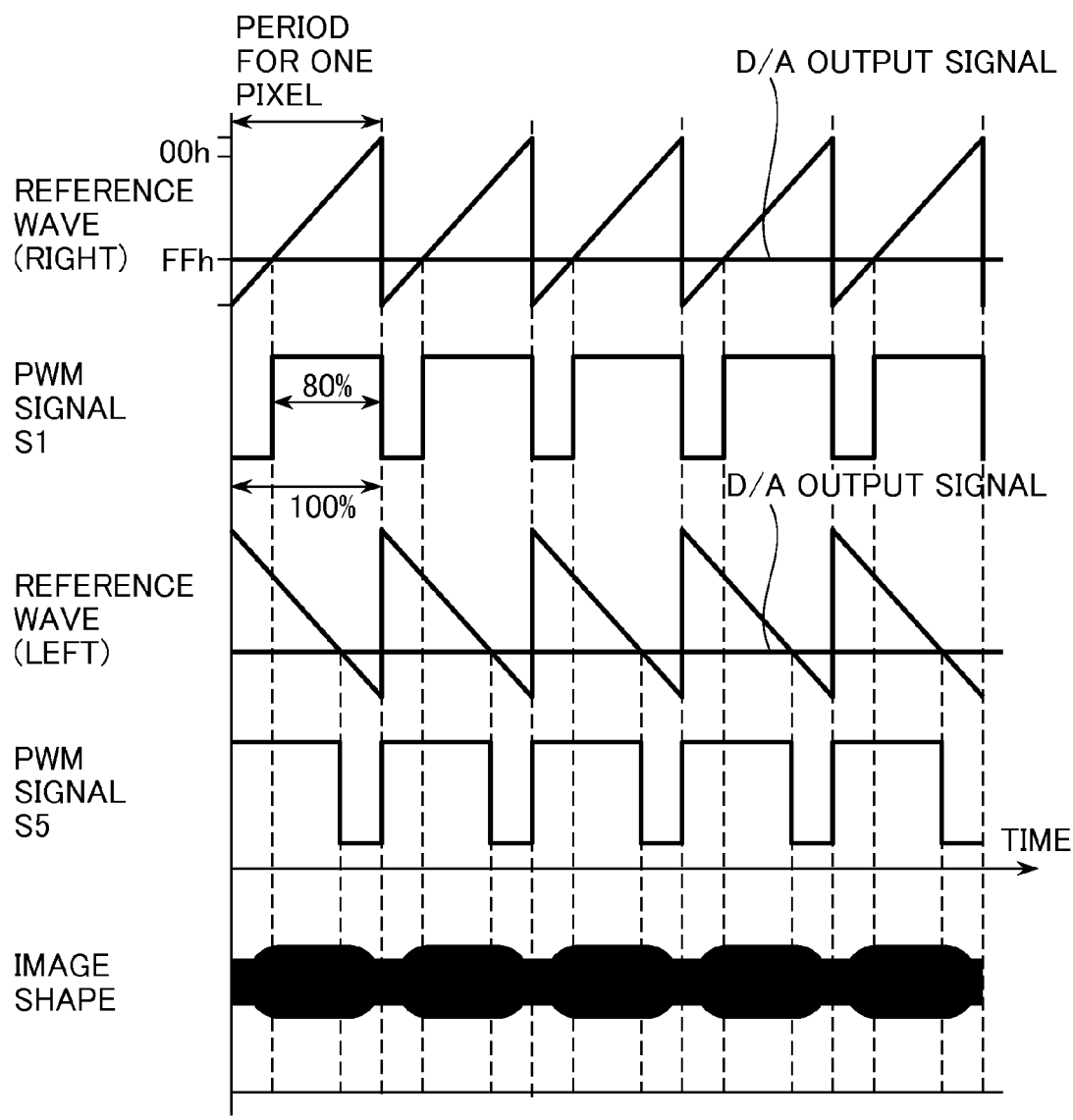
FIG. 5 is a diagram showing various signal waveforms and a shape of an output image in a case of a binary image according to the embodiment of the present invention.

In a case where the binary image is formed in the present embodiment, the two lasers L performing the multiple exposure refer to the reference waves, which are different from each other, and generate the PWM signal S. That is, the two lasers L are controlled to have the scanning start points different from each other FIG. 5 shows the waveform of the reference wave, the waveform of the pulse width modulation signal (the PWM signal), and a shape of an obtained line image, in a case where a line image (a binary image) of 600 dpi in the main scanning direction is formed. A case is herein described where the multiple exposure is performed with the lasers L1, L5, but the present invention is not limited thereto as long as the multiple exposure is performed with two lasers disposed on the identical main scanning line on the light emitting surface of the surface-emitting laser 31. For example, the multiple exposure may be performed with the lasers L2, L6, the lasers L3, L7, and the lasers L4, L8.

The selector 10 of the PWM circuit 400 corresponding to the laser L1 selects the reference wave (right) 9R when data representing the line image is input as the image identification data 7 to the selector 10. In a case where the line image is to be formed, the image data 1 having "FFh" for all the pixels is input to the PWM circuit 400 corresponding to the laser L1. It should be noted that the D/A output signal 6a has been adjusted by the volume circuit 13 as describe above, and accordingly, as shown in FIG. 5, an electrical potential of the D/A output signal 6a corresponding to a value "FFh" of the image data 1 is set to be a value smaller than a maximum electrical potential of the reference wave (right) 9R.

Therefore, even where the value of the image data 1 is "FFh", the laser L does not emit light for 100% of a period for one pixel. For example, the PWM signal S1 output from the comparator 12 of the PWM circuit 400 corresponding to the laser L1 determines that the laser L1 emits light for 80% of a period for the one pixel, as shown in FIG. 5. That is, the PWM signal is output that has the right growth starting at the right end of the pixel and has a width of 80% of the one pixel.

The laser L5 performs the multiple exposure on the pixel exposed to the laser L1. The selector 10 of the PWM circuit 400 corresponding to the laser L5 selects the reference wave (left) 9L when data representing the line image is input as the image identification data 7 to the selector 10. "FFh" is input as the value of the image data 1 to the PWM circuit 400 corresponding to the laser L5 in a similar manner as the PWM circuit 400 corresponding to the laser L1. The PWM signal S5 output from the PWM circuit 400 corresponding to the laser L5 is as shown in FIG. 5. The D/A output signal 6a is adjusted by the volume circuit 13 as described above, and accordingly, the electrical potential of the D/A output signal 6a corresponding to the value "FFh" of the image data 1 is set to be a value smaller than a maximum electrical potential of the reference wave (left) 9L as shown in FIG. 5. That is, even where the value of the image data 1 is "FFh", the laser L does not emit light for 100% of the period for the one pixel, and the PWM signal S1 output from the comparator 12 of the PWM circuit 400 corresponding to the laser L5 determines that the laser L5 emits light for 80% of the period for one pixel, as shown in FIG. 5. That is, the PWM signal is output that has the left growth starting at the left end of the pixel and has a width of 80% of the one pixel.

Herein, the PWM circuits 400 relating to the lasers L1, L5 use saw-tooth waveforms, as the reference wave, in symmetrical relationship with each other. In other words, the PWM circuits 400 relating to the lasers L1, L5 use the reference waves whose phases are inverted to each other. Accordingly, the PWM circuits 400 relating to the lasers L1, L5 outputs the PWM signals S1, S5 having a "low" portion (a turned off period) in phase forms inverted to each other in the period for each pixel. Specifically, the PWM signal S1 has the turned off period at the beginning portion of the period (region) for each pixel, and the PWM signal S5 has the turned off period at the last portion of the period (region) for each pixel. Thus, the lasers L1, L5 are controlled so that their scanning start points are different from each other.

Therefore, in a case where the lasers L1, L5 perform the multiple exposure of the identical pixels so as to form the line image, when viewing one pixel subjected to the multiple-exposure, at least one of the laser lights of the lasers L1, L5 is always turned on (exposing: lighting) throughout the period for the pixel because the positions exposed to the lasers L1 and L5 are shifted so that there is no occasion when the laser lights are turned off (non-exposing: extinguished) in the period for the pixel. Thus, in a formed image, the width of the line slightly narrows at each of between the pixels formed by the laser L1 and the pixels formed by the laser L5, but the multiple-exposed pixels do not interrupt the line and form the continuous line. In other words, a plurality of lights relating to the PWM signal S can provide the multiple exposure without deterioration in the quality of the line image and the character image.

Figure 6:
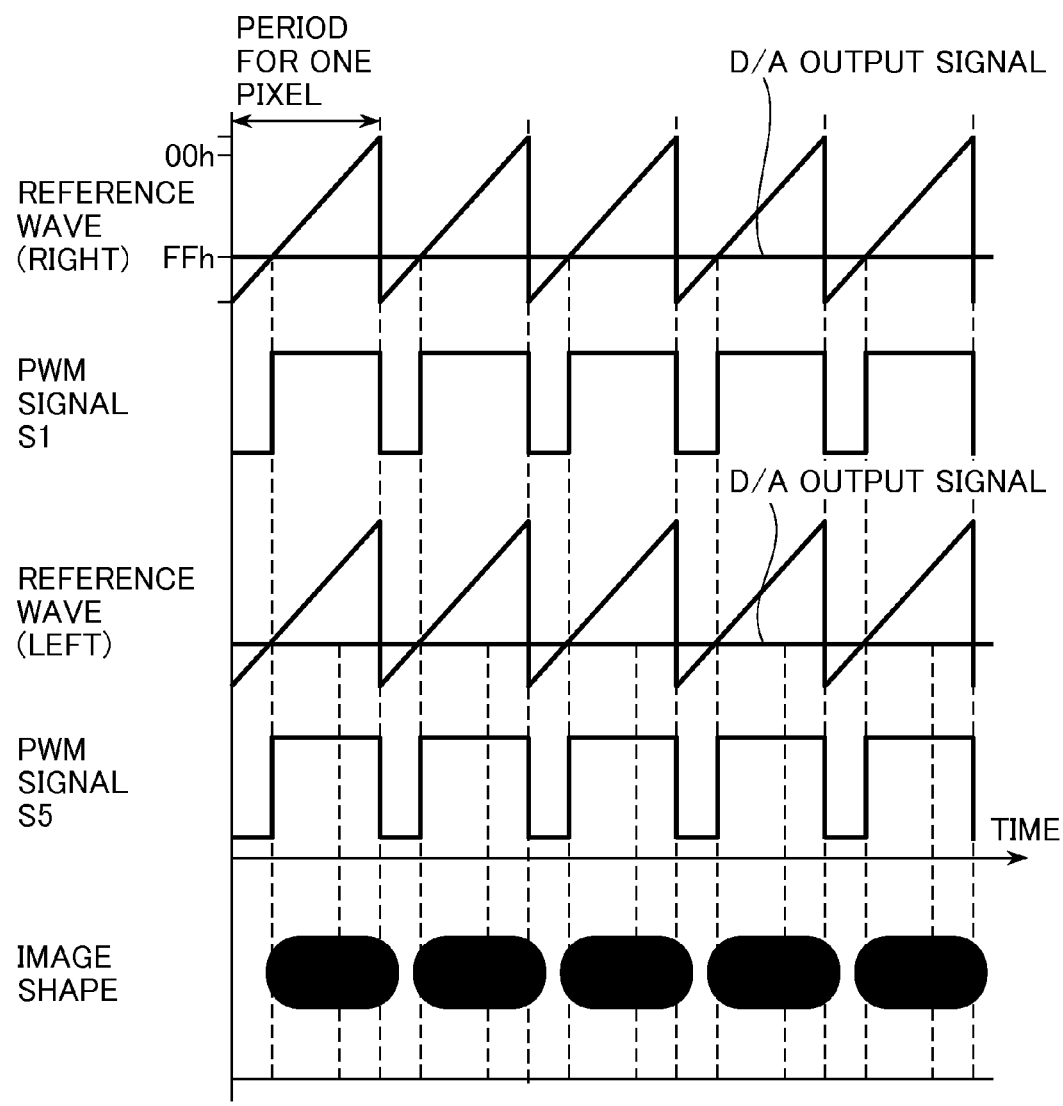
FIG. 6 is a diagram showing various signal waveforms and a shape of an output image in the case of the binary image according to a comparative example as opposed to FIG. 5.

FIG. 6 is a diagram showing various signal waveforms and a shape of an output image in the case of the binary image according to a comparative example as opposed to FIG. 5. It is assumed that both of the PWM circuits 400 relating to the lasers L1, L5 performing the multiple exposure use the reference wave (right) 9R. In this case, the PWM circuits 400 relating to the lasers L1, L5 performing the multiple exposure use the reference wave (right) 9R the same waveform, and the reference wave (right) 9R is supplied to the comparator 12 as waveform data at a synchronized pixel position.

Thus, the lasers L1, L5 performing the multiple exposure are controlled of driving by the PWM signals S1, S5 having the same waveform and of the same phase, and when viewing the multiple-exposed pixel, a non-exposed portion will be created in the multiple-exposed pixel in the period for one pixel because the positions exposed to the lasers L1 and L5 are the same. Accordingly, a formed image is a low quality binary image (the line image, the character image) having interruptions as shown in FIG. 6.

Figure 7:
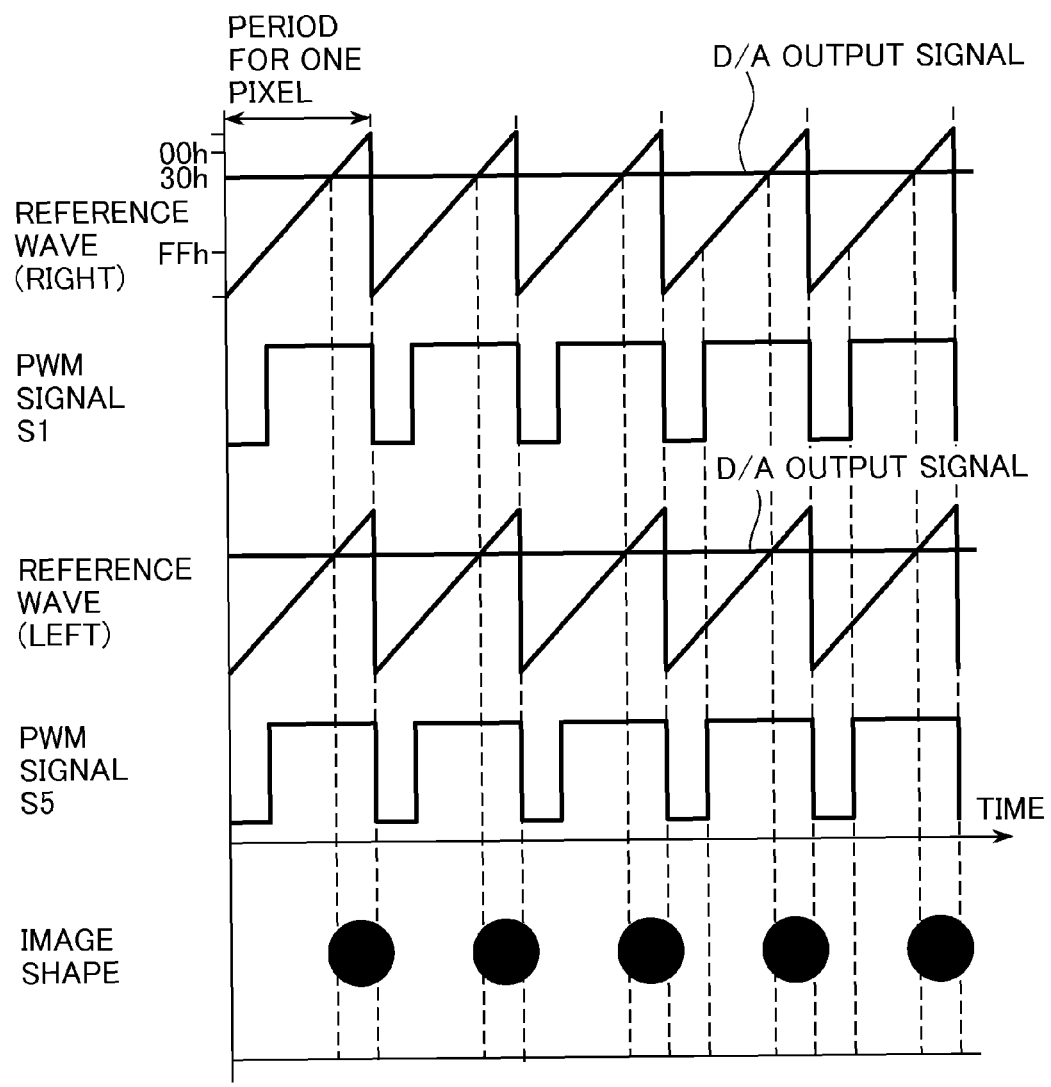
FIG. 7 is a diagram showing various signal waveforms and a shape of an output image in a case of a gradation image according to the embodiment of the present invention.

On the other hand, in a case where the gradation image is formed, the lasers L1, L5 perform the multiple exposure on the identical position in the identical pixel as shown in FIG. 7. It should be noted that FIG. 7 shows a case where the electrical potential of the D/A output signal 6a corresponds to a value "30h" of the image data 1.

In FIG. 7, the selector 10 of the PWM circuits relating to the lasers L1, L5 performing the multiple exposure selects the identical reference wave based on the image identification data 7 determining the gradation image (for example, the non-character image). Herein, the reference wave (right) 9R is selected for both. Further, the reference wave (right) 9R is synchronized with each pixel. Accordingly, the PWM signals S1, S5 output from the PWM circuits 400 relating to the lasers L1, L5 are signals having exactly the same pulse waveforms and phases. The lasers L1, L5 perform the multiple exposure on the identical position of the identical pixel to form an image, and the formed image faithfully reflects the density determined by the original image data. That is, the lasers L1, L5 are controlled so that their scanning start points are the same with respect to each other.

This is because in the gradation image, a stability of area as dots expressing the density is regarded as more important than the shape of the formed image. Further, in the electrophotographic printing method, it is preferable to have a deeper level of the electrical potential of the electrostatic latent image so as to stabilize the dots against unevenness in the electrical potential and other external disturbances. Thus, in a case of the gradation image, the multiple exposure on the identical position as described above achieves a better image.

Furthermore, the multiple exposure on the identical position is preferable so as to maintain continuity in the density of the image with respect to the image data. This is because of a characteristic peculiar to the electrophotographic printing in which the density changes according to a size of an exposed area even if a total amount of exposing light per one pixel is the same. Further, there is a possibility that the continuity of change in the density may be interrupted if the light emitting position of the multiple exposure is changed at a certain gradation value in the density gradation. Also because of this point, the multiple exposure on the identical position is preferable for the gradation image.

On the other hand, where the binary image such as the character image, the line image, and the like is to be formed, the density is stable because the image is usually formed at the maximum light amount, and accordingly, the resolution and the accuracy of the shape are regarded as more important than the density. In a case where the binary image is to be formed, the present embodiment gives importance to the accuracy of the shape so as to continuously form the line. That is, the present embodiment enables forming a high quality image without any interruptions in the character image and the line image while achieving linearity of the laser light amount for the image data.

In a case where the present embodiment is applied, it is preferable to set the maximum light amount of each of the lasers L1 to L8 so that the line image and the character image can be formed not only with the multiple exposure but also with a single exposure. This is because there may be a case that the image quality with regard to the density deteriorates all the more if the single exposure is unable to form the line image and the character image.

Figure 8:
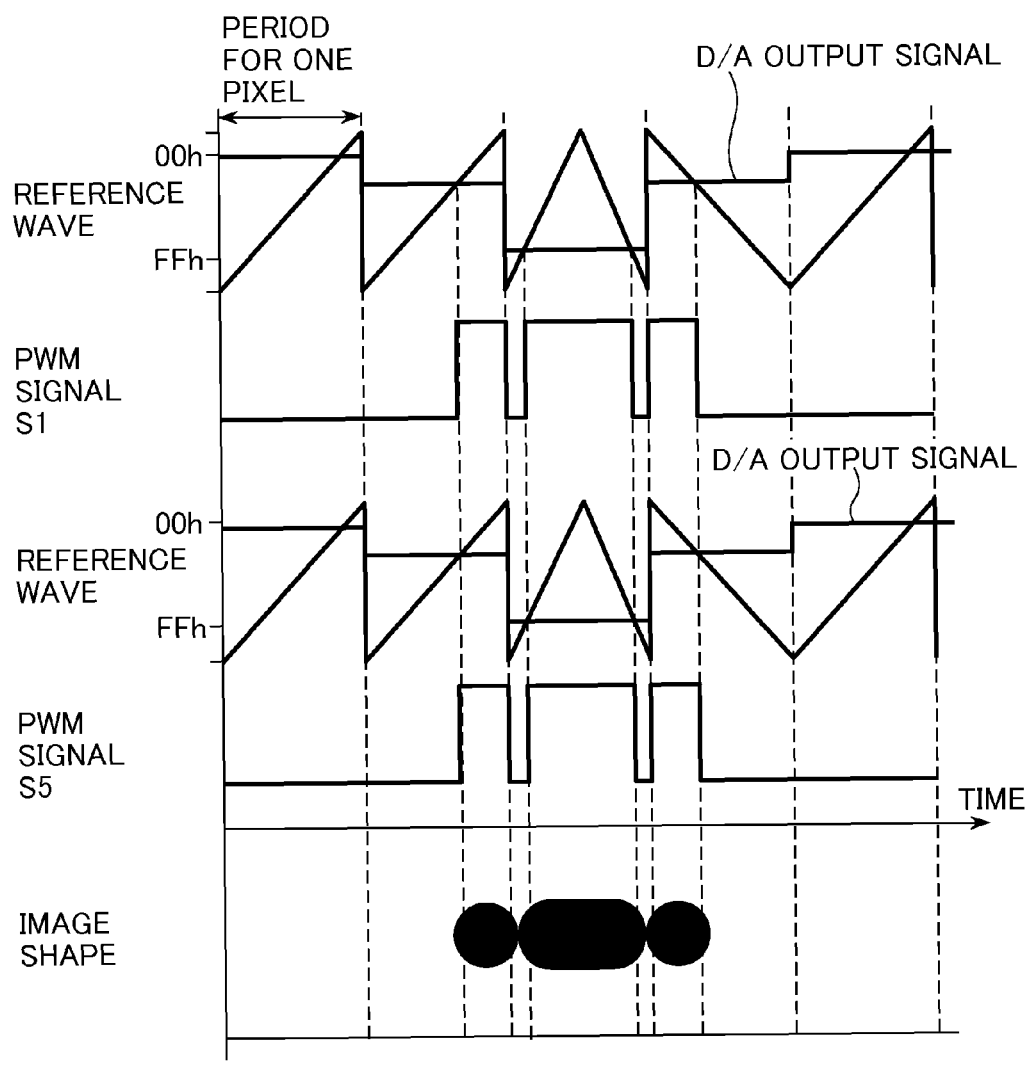
FIG. 8 is a diagram showing various signal waveforms and a shape of an output image according to the embodiment of the present invention where a reference waveform is switched depending on each pixel of image data.

It should be noted that the reference wave can be switched for each pixel of the image data. For example, as shown in FIG. 8, a combining manner of the various reference waves may be varied as necessary for each pixel to form the image. In the above description, the reference wave (middle) 9M, the reference wave (left) 9L, and the reference wave (right) 9R are selected for each one line in the main scanning direction according to the image identification data 7, but the reference wave (middle) 9M, the reference wave (left) 9L, and the reference wave (right) 9R may be switched at a midway of one line according to the image identification data 7 where a character portion and a non-character portion, namely, the binary image and the gradation image, are co-existing in the main scanning direction. Furthermore, the reference wave (middle) 9M, the reference wave (left) 9L, and the reference wave (right) 9R may be selected for each pixel. FIG. 8 is an example in which the reference wave (right) 9R is selected for the first and second pixels, the reference wave (middle) 9M is selected for the third pixel, the reference wave (left) 9L is selected for the fourth pixel, and the reference wave (right) 9R is selected for the fifth pixel. Thus, the scanning start points of neighboring pixels may be controlled to be different from each other according to the image identification data 7, and each of the scanning start points of the lasers L performing the multiple exposure may be controlled to be different.

Figure 9:
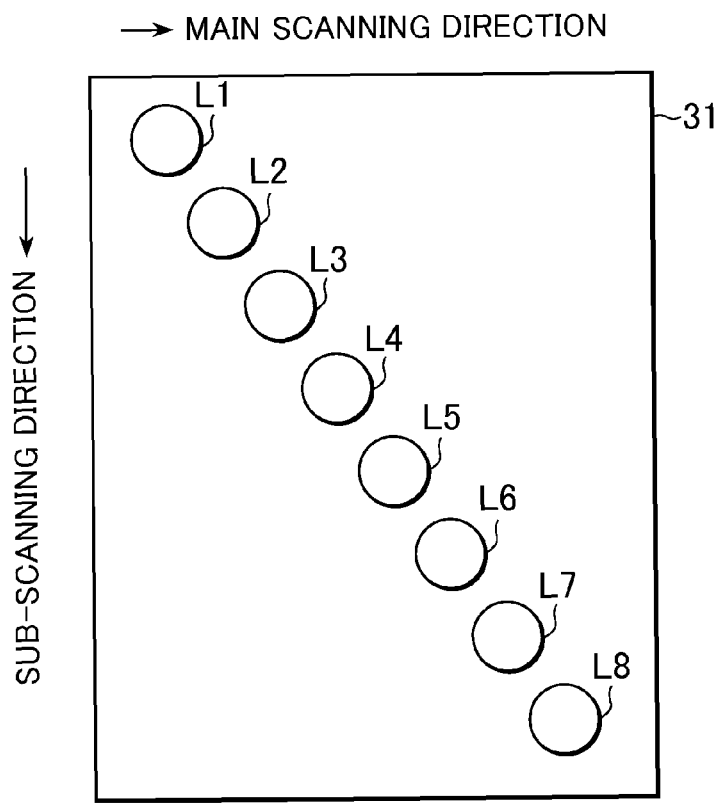
FIG. 9 is a diagram showing a variation of the light-emitting surface of the surface-emitting laser of FIG. 3.
Figure 10:
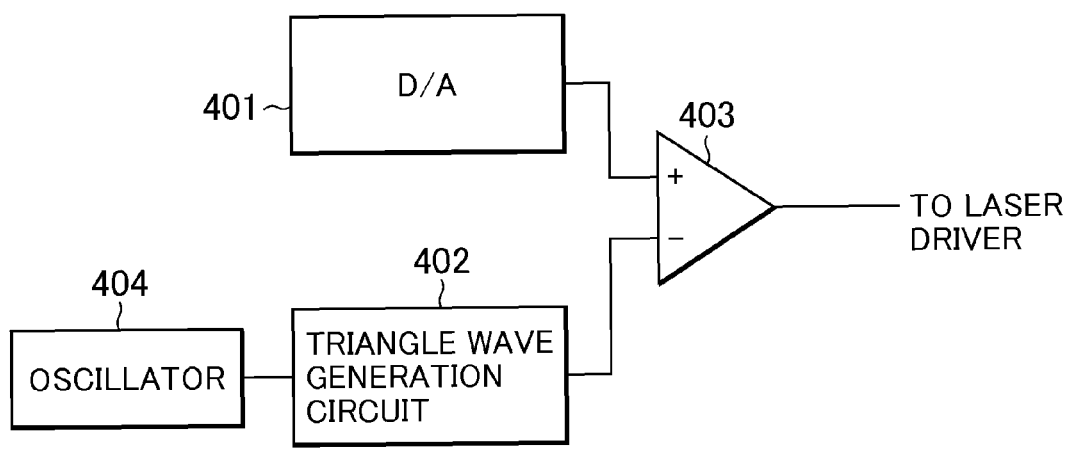
FIG. 10 is a block diagram showing a structure of a conventional PWM circuit.
Figure 11:
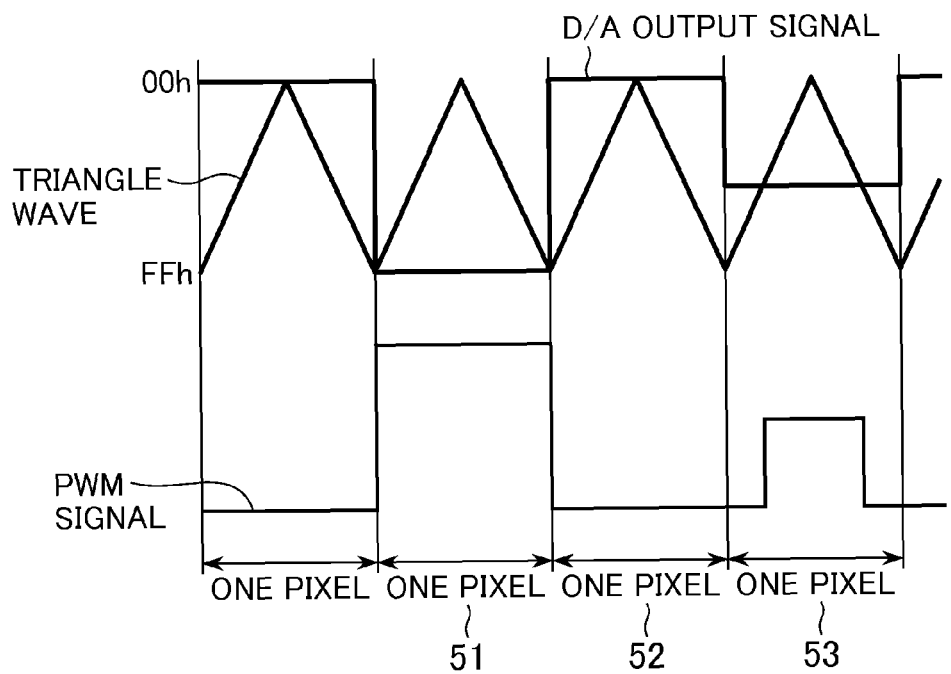
FIG. 11 is a diagram showing a relationship between a reference waveform, a D/A output signal, a PWM signal waveform, and a shape of an output image according to the conventional PWM circuit.

The present invention is not limited to the above embodiments, and for example, it is possible to use the surface-emitting laser 31 structured as shown in FIG. 9.

In the surface-emitting laser 31 as shown in FIG. 3, the multiple exposure is performed with pairs of two lasers that are formed on an identical main scanning line and are not spaced apart in the sub-scanning direction: the lasers L1, L5, the lasers L2, L6, the lasers L3, L7, and the lasers L4, L8. In contrast, in the surface-emitting laser 31 as shown in FIG. 9, the multiple exposure is performed with pairs of two lasers that are disposed on different main scanning lines and spaced apart in the sub-scanning direction: the lasers L1, L5, the lasers L2, L6, the lasers L3, L7, and the lasers L4, L8.

That is, the surface-emitting laser 31 as shown in FIG. 9 has the lasers L1 to L8 disposed in the sub-scanning direction with an interval of one pixel and disposed in the main scanning direction with an interval of two thirds of the pixel. Further, when the scanning exposure is performed on an image holder, the scanning exposure with the lasers L1 to L4 is performed overlappingly on the main scanning line that has been scanned by and exposed to the lasers L5 to L8 in the previous scanning exposure.

In other words, the PWM signal based on the image data relating to the identical main scanning line is supplied to the lasers L1, L5, the lasers L2, L6, the lasers L3, L7, and the lasers L4, L8 at each of the previous and the current scanning exposure, so that the identical pixel is multiple exposed. This scanning exposure method has a drawback in image formation speed because the speed becomes half in a case of the present embodiment, but has an advantage that a streak image caused by variation in the scanning intervals becomes inconspicuous. It should be noted that the selection method of the reference wave and the like are the same as those of the surface-emitting laser 31 of FIG. 3, and the detailed description thereabout is omitted.

Instead of the circuit using the reference wave as shown in FIG. 4, the PWM circuit 400 may be, for example, a digital PWM circuit driving at a clock frequency sufficiently higher than a scanning time for one pixel so as to enable formation of the PWM signal of an arbitrary phase so that non-exposed portions of the light beams relating to the multiple exposure are not overlapped.

In the above embodiment, timings of light emission at each pixel are made different between the light beams relating to the multiple exposure where the binary image is formed, and timings of light emission at each pixel is made the same where the gradation image is formed. However, in a case of an arbitrary image, such as the line image of light density, that has the image data value within a certain range and gives higher priority to the shape rather than the stability of the density, the timings of light emission at each pixel may be made different between the light beams relating to the multiple exposure.

Furthermore, also in a case where the multiple exposure on the identical pixel position is performed using three or more light beams, the above embodiment may be applied to eliminate a non-exposed pixel region when forming the binary image and the like.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions.

This application claims the benefit of Japanese Patent Application Nos. 2007-201947 filed Aug. 2, 2007, and 2008-194345 filed Jul. 29, 2008, which are hereby incorporated by reference herein in their entirety.

What is claimed is:

1. An image forming apparatus forming an electrostatic latent image by performing a multiple exposure of an identical pixel position region of a photosensitive body with a plurality of light beams pulse-width-modulated based on image data, the image forming apparatus comprising:
 a light source adapted to emit the plurality of light beams; and
 a control unit adapted to control the scanning start points, within one pixel period for each pixel region, of the plurality of light beams performing the multiple exposure,
 wherein said control unit controls scanning reference start points to be different between a first light beam and a second light beam, among the plurality of light beams, while exposing the identical pixel position region.

2. The image forming apparatus according to claim 1, wherein the light source is disposed at an identical position with respect to a sub-scanning direction.

3. The image forming apparatus according to claim 1, wherein the light source is disposed at different positions with respect to a sub-scanning direction.

4. An image forming apparatus forming an electrostatic latent image by performing a multiple exposure of an identical pixel position region of a photosensitive body with a plurality of light beams pulse-width-modulated based on image data, the image forming apparatus comprising:
 a light source adapted to emit the plurality of light beams; and
 a control unit adapted to control the scanning start points, within one pixel period for each pixel region, of the plurality of light beams performing the multiple exposure,
 wherein said control unit controls scanning reference start points to be different between a first light beam and a second light beam, among the plurality of light beams, while exposing the identical pixel position region;
 wherein a type of the image data is a binary image, and said control unit controls the scanning reference start points to be different between the first light beam and the second light beam exposing the identical pixel position region.

5. An image forming apparatus forming an electrostatic latent image by performing a multiple exposure of an identical pixel position region of a photosensitive body with a plurality of light beams pulse-width-modulated based on image data, the image forming apparatus comprising:
 a light source adapted to emit the plurality of light beams; and
 a control unit adapted to control the scanning start points, within one pixel period for each pixel region, of the plurality of light beams performing the multiple exposure,
 wherein where a type of the image data is a binary image, said control unit controls the scanning reference start points to be different between the first light beam and the second light beam exposing the identical pixel position region, and wherein where the type of the image data is a gradation image, said control unit controls the scanning reference start points to be an identical reference point between the first light beam and the second light beam while exposing the identical pixel position region.

* * * * *